(12) United States Patent
Kim

(10) Patent No.: US 11,912,194 B2  
(45) Date of Patent: Feb. 27, 2024

(54) APPARATUS AND METHOD FOR OUTPUTTING SOUND OF VEHICLE

(71) Applicants: Hyundai Motor Company, Seoul (KR); Kia Corporation, Seoul (KR)

(72) Inventor: Keun Jin Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/373,003

(22) Filed: Jul. 12, 2021

(65) Prior Publication Data
US 2022/0242309 A1    Aug. 4, 2022

(30) Foreign Application Priority Data

Jan. 29, 2021 (KR) .................. 10-2021-0013350

(51) Int. Cl.
| | | |
|---|---|---|
| *B60Q 5/00* | (2006.01) | |
| *H04R 3/02* | (2006.01) | |
| *G10K 11/178* | (2006.01) | |

(52) U.S. Cl.
CPC .......... *B60Q 5/005* (2013.01); *G10K 11/1781* (2018.01); *G10K 11/1783* (2018.01); *H04R 3/02* (2013.01); *H04R 2499/13* (2013.01)

(58) Field of Classification Search
CPC .. H04R 3/02; H04R 2499/13; G10K 11/1781; G10K 11/1783; B60Q 5/005
See application file for complete search history.

(56) References Cited

U.S. PATENT DOCUMENTS

| | | | | |
|---|---|---|---|---|
| 5,748,748 | A * | 5/1998 | Fischer | G10K 11/17833 381/86 |
| 10,235,987 | B1 * | 3/2019 | Valeri | G10K 11/17823 |
| 2005/0113168 | A1 * | 5/2005 | Maeda | G10K 15/02 463/35 |
| 2006/0269078 | A1 * | 11/2006 | Sakamoto | G10K 11/1783 381/71.1 |
| 2008/0152166 | A1 * | 6/2008 | Shiomi | H04R 5/04 381/94.1 |
| 2008/0292110 | A1 * | 11/2008 | Kobayashi | G10K 11/17857 381/71.4 |
| 2010/0239110 | A1 * | 9/2010 | Lasch | H03G 3/24 381/307 |
| 2011/0206213 | A1 * | 8/2011 | Sakamoto | G10K 11/17854 381/71.4 |
| 2012/0257763 | A1 * | 10/2012 | Bowden | G10K 11/17823 381/71.4 |

(Continued)

OTHER PUBLICATIONS

The LMS Test.Lab Modal Analysis Manual; LMS Test.Lab; Rev 12A; Copyright CMS International 2012.

*Primary Examiner* — Daniel R Sellers  
(74) *Attorney, Agent, or Firm* — Fox Rothschild LLP (57) ABSTRACT

A sound output apparatus of a vehicle may include a sensor sensing a driving speed of the vehicle and a number of revolutions of a driving motor, a storage storing opposed-phase sound sources of a noise according to the number of revolutions of the driving motor, and a controller allowing an opposed-phase sound source corresponding to the number of revolutions of the driving motor, from among the opposed-phase sound sources stored in the storage to be output when the driving speed of the vehicle exceeds a predetermined speed.

14 Claims, 8 Drawing Sheets

(56) References Cited

U.S. PATENT DOCUMENTS

| | | | |
|---|---|---|---|
| 2014/0286505 A1* | 9/2014 | Sakamoto | G10K 11/17883 |
| | | | 381/94.7 |
| 2019/0311705 A1* | 10/2019 | Trumpy | G10K 15/02 |
| 2020/0184946 A1* | 6/2020 | Jung | B60C 5/008 |
| 2020/0193960 A1* | 6/2020 | Jung | G10L 25/51 |
| 2021/0001769 A1* | 1/2021 | Bastyr | B60W 30/18009 |
| 2021/0104215 A1* | 4/2021 | Valeri | G10K 11/17821 |

\* cited by examiner

APPARATUS AND METHOD FOR OUTPUTTING SOUND OF VEHICLE

CROSS-REFERENCE TO RELATED APPLICATION

This application claims under 35 U.S.C. § 119(a) the benefit of Korean Patent Application No. 10-2021-0013350, filed in the Korean Intellectual Property Office on Jan. 29, 2021, the entire contents of which are incorporated herein by reference.

BACKGROUND

(a) Technical Field

The present disclosure relates to an apparatus and method for outputting a sound of a vehicle.

(b) Description of the Related Art

In an electric vehicle (EV), noises such as engine noise are hardly generated, because an electric vehicle is driven by a motor, not an internal combustion engine. Accordingly, to allow pedestrians to perceive that a vehicle is being driven, a virtual engine sound system (VESS), which outputs a virtual engine sound, may be installed in the electric vehicle.

On the other hand, when an electric vehicle is driven at high speed, various noises may be generated from components involved in driving the electric vehicle, such as the noise of a motor, the noise of a decelerator, or a switching noise. This noise is less than an engine sound, but causes discomfort to passengers. Accordingly, there is a need to develop a technology for reducing the noise generated by electric vehicle parts provided in the electric vehicle.

SUMMARY

An aspect of the present disclosure provides an apparatus and method for outputting a sound of a vehicle that is capable of reducing noise generated by certain parts in an electric vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a sound output apparatus of a vehicle may include a sensor sensing a driving speed of the vehicle and a number of revolutions of a driving motor, a storage storing opposed-phase sound sources of a noise according to the number of revolutions of the driving motor, and a controller allowing an opposed-phase sound source corresponding to the number of revolutions of the driving motor, from among the opposed-phase sound sources stored in the storage to be output when the driving speed of the vehicle exceeds a predetermined speed.

The controller may perform Fast Fourier Transform (FFT) on the noise according to the number of revolutions of the driving motor and obtain frequency information of the noise.

The controller may track a noise of a specific order to be reduced based on the frequency information of the noise depending on the number of revolutions of the driving motor.

The order may indicate a number of events each of which causes a noise per unit rotation of the driving motor.

The controller may convert the noise of the specific order tracked depending on the number of revolutions of the driving motor into time data.

The controller may generate an opposed-phase sound source of the noise of the specific order to be converted into the time data and may control the storage to store the time data.

The controller may obtain and store an opposed-phase sound source that is pre-generated in response to a predetermined accumulated distance driven.

The controller may update the opposed-phase sound sources stored in the storage as the pre-generated opposed-phase sound source depending on an accumulated distance driven when the accumulated distance driven of the vehicle is the predetermined accumulated distance driven.

According to an aspect of the present disclosure, a method of outputting a sound of a vehicle may include: storing, by a storage, opposed-phase sound sources of a noise according to the number of revolutions of a driving motor of the vehicle; sensing, by a sensor, a driving speed of the vehicle and the number of revolutions of the driving motor when the driving speed of the vehicle exceeds a predetermined speed; and outputting, by a controller, an opposed-phase sound source corresponding to the sensed number of revolutions of the driving motor among the stored opposed-phase sound sources.

The storing of the opposed-phase sound sources may further include performing FFT on the noise according to the number of revolutions of the driving motor to obtain frequency information of the noise.

The storing of the opposed-phase sound sources may further include tracking a noise of a specific order to be reduced based on the frequency information of the noise depending on the number of revolutions of the driving motor.

The order may indicate a number of events each of which causes a noise per unit rotation of the driving motor.

The storing of the opposed-phase sound sources may further include converting the noise of the specific order tracked depending on the number of revolutions of the driving motor into time data.

The storing of the opposed-phase sound sources may include generating an opposed-phase sound source of the noise of the specific order to be converted into the time data.

The method may further include obtaining and storing an opposed-phase sound source that is pre-generated in response to a predetermined accumulated distance driven.

The method may further include updating the stored opposed-phase sound sources as the pre-generated opposed-phase sound source depending on an accumulated distance driven when the accumulated distance driven of the vehicle is the predetermined accumulated distance driven.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Figure 1:
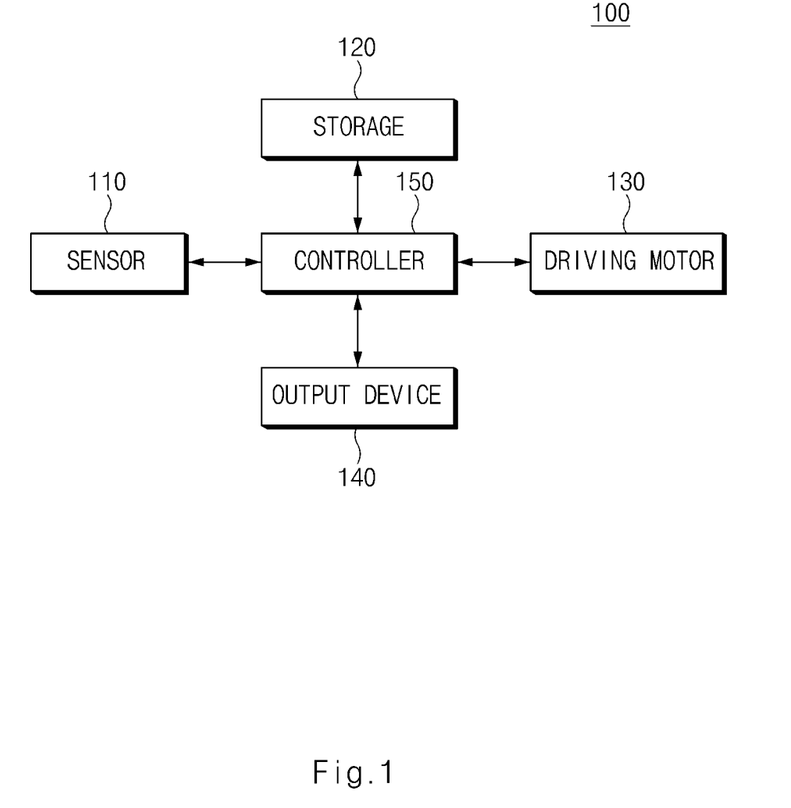
FIG. 1 is a diagram illustrating a sound output apparatus of a vehicle according to an embodiment of the present disclosure.

FIG. 1 is a diagram illustrating a sound output apparatus of a vehicle according to an embodiment of the present disclosure.

As illustrated in FIG. 1, a sound output apparatus 100 of a vehicle according to an embodiment of the present disclosure may include a sensor 110, storage 120, a driving motor 130, an output device 140, and a controller 150.

The sensor 110 may sense driving information of the vehicle. Herein, the driving information may include a driving speed of the vehicle and a number of revolutions of the driving motor 130. According to an embodiment, the sensor 110 may include a vehicle speed sensor and a hall sensor.

The storage 120 may store at least one algorithm for performing calculation or execution of various commands for an operation of the sound output apparatus of a vehicle according to an embodiment of the present disclosure. The storage 120 may store an opposed-phase sound source of a noise according to the number of revolutions of the driving motor 130. Besides, the storage 120 may store an opposed-phase sound source updated depending on an accumulated distance driven of the vehicle. The storage 120 may include at least one storage medium of a flash memory, a hard disk, a memory card, a read-only memory (ROM), a random access memory (RAM), an electrically erasable programmable read only memory (EEPROM), a programmable read-only memory (PROM), a magnetic memory, a magnetic disk, or an optical disc.

The driving motor 130 may be a device that provides power to a drive shaft of an electric vehicle, and may drive the vehicle by delivering an appropriate torque to wheels while a decelerator is connected to a shaft of the driving motor 130. The driving motor 130 may operate by receiving power applied from an inverter that converts DC power of a battery into AC power.

The output device 140 may include a speaker that outputs a virtual engine sound generated by the controller 150 or an opposed-phase sound source of a noise in the vehicle.

The controller 150 may be implemented by various processing devices such as a microprocessor equipped with a semiconductor chip capable of performing or executing various commands, and may control an operation of the sound output apparatus of a vehicle according to an embodiment of the present disclosure. In detail, when a driving speed of the vehicle exceeds a predetermined speed, the controller 150 may allow an opposed-phase sound source corresponding to the sensed number of revolutions of a motor among opposed-phase sound sources stored in the storage 120 to be output.

First of all, the controller 150 may store an opposed-phase sound source of a noise according to the number of revolutions of the driving motor 130. The controller 150 may determine whether the driving speed of a vehicle exceeds a predetermined speed. According to an embodiment of the present disclosure, the controller 150 may determine whether the driving speed of the vehicle exceeds 30 km/h.

When determining that the driving speed of the vehicle exceeds a predetermined speed, the controller 150 may detect the number of revolutions of the driving motor 130.

Moreover, the controller 150 may obtain the noise of the driving motor 130, the noise of a decelerator, and the noise of an inverter that are generated as the driving motor 130 rotates. According to an embodiment of the present disclosure, the controller 150 may separate the noise of the driving motor 130, the noise of the decelerator, and the noise of the inverter, which are generated as the driving motor 130 rotates, from one another depending on the number of revolutions of the driving motor 130, and may obtain the separated noises.

The controller 150 may obtain and store each frequency information of the noise of the driving motor 130, the noise of the decelerator, and the noise of the inverter that are generated as the driving motor 130 rotates. According to an embodiment, the controller 150 may perform Fast Fourier Transform (FFT) on the noise of the driving motor, the noise of the decelerator, and the noise of the inverter depending on the number of revolutions of the driving motor 130 and may convert the transformed noise into frequency information depending on the number of revolutions of the driving motor 130. The more detailed description will be given with reference to FIG. 2.

Figure 2:
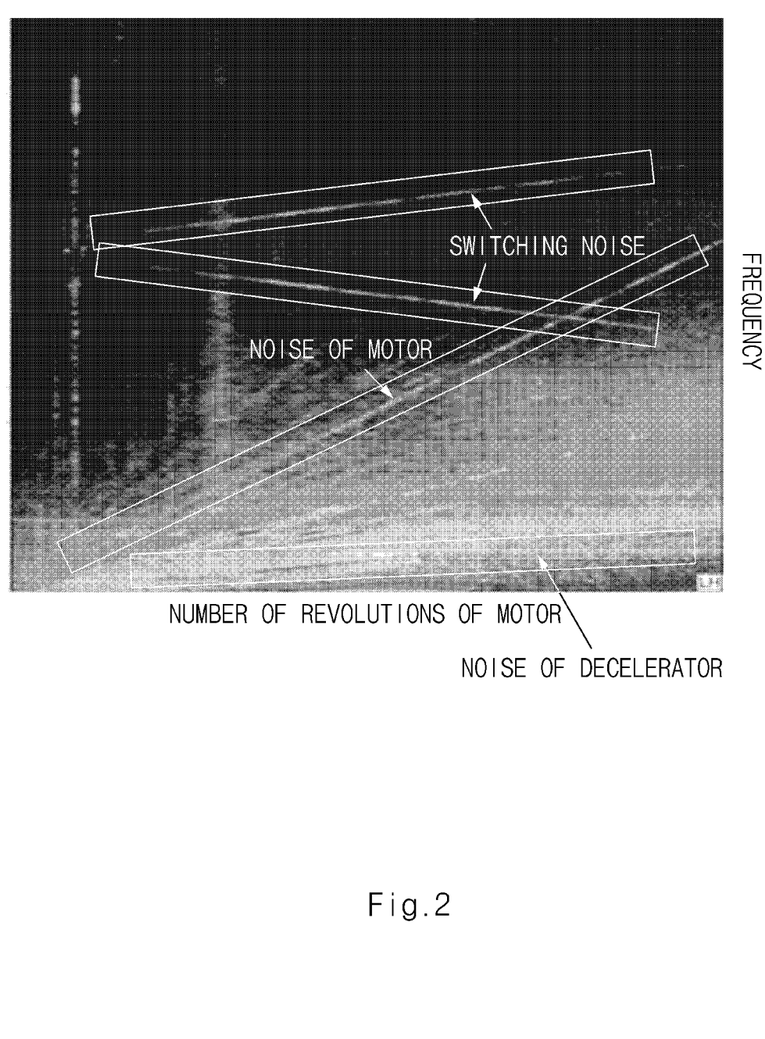
FIG. 2 is a graph illustrating a FFT-transformed noise in a vehicle according to an embodiment of the present disclosure.

FIG. 2 is a graph illustrating a FFT-transformed noise in a vehicle according to an embodiment of the present disclosure.

The controller 150 may perform FFT on a noise of the driving motor 130, a noise of a decelerator, and a noise of an inverter, which are generated as the driving motor 130 rotates, and, as illustrated in FIG. 2, may obtain frequency information according to the number of revolutions of a driving motor of each of the noise of the driving motor 130, the noise of the decelerator, and the noise of the inverter. Herein, a case that the controller 150 obtains the frequency information according to the number of revolutions of the driving motor is for the purpose of extracting only a specific noise to be reduced (canceled) based on the obtained frequency information. The more detailed description of an operation of extracting a specific noise will be described with reference to FIG. 3.

Figure 3:
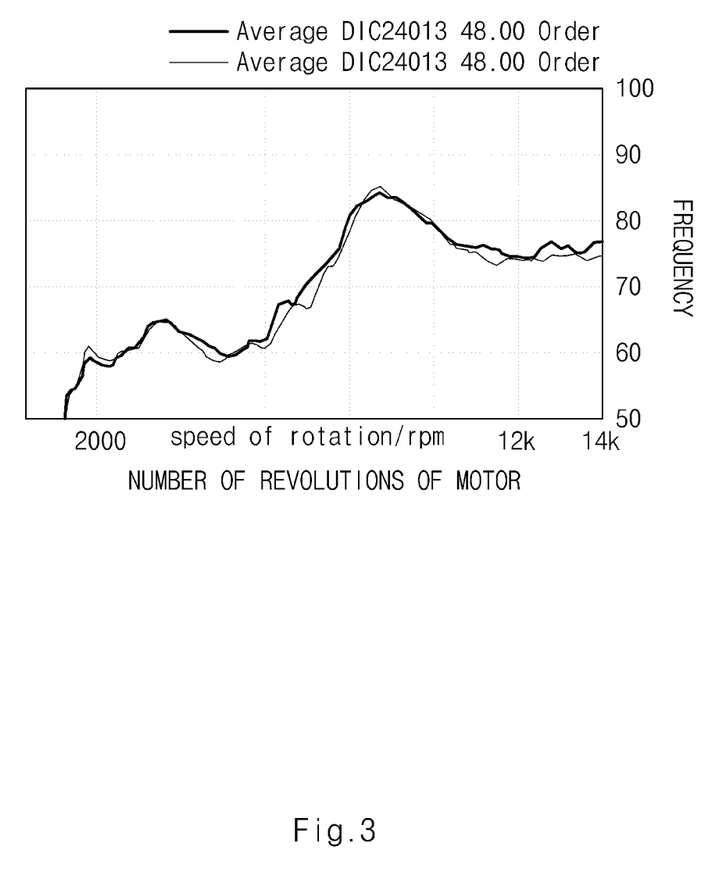
FIG. 3 is a graph illustrating a frequency of a specific order noise tracked depending on the number of revolutions of a motor according to an embodiment of the present disclosure.

FIG. 3 is a graph illustrating a frequency of a specific order noise tracked depending on the number of revolutions of a motor according to an embodiment of the present disclosure.

As illustrated in FIG. 2, the controller 150 may extract a specific order of a noise to be reduced based on frequency information, to which the noise is converted, according to the number of revolutions of the driving motor and may track the frequency according to the number of revolutions of a motor of a specific order noise. Here, the order may indicate a number of events each of which causes a noise per unit rotation of a motor. According to an embodiment of the present disclosure, when a part (a part (e.g., a pump, a gear, or the like) associated with a driving motor) is repeatedly touched or vibrated to cause a noise while a driving motor rotates, it is preferably understood that the order is the number of times that the part is repeatedly touched or vibrated. For example, when a sound, which is generated when gears collide with each other, occurs 48 times, while the driving motor rotates, the sound generated when the gears collide with each other causes a noise. Accordingly, it is preferably understood that the sound generated when the gears collide with each other is a noise having the order of 48.

When reducing a noise having the order of 48, the controller 150 may extract the noise having the order of 48 based on the frequency information of the noise, and may track the frequency information of the noise having the order of 48 depending on the number of revolutions of the motor (order tracking).

When the frequency information according to the number of revolutions of the motor having the specific order noise (e.g., a noise having the order of 48) to be reduced is tracked, the controller 150 may convert the frequency information into time data. Here, the time data may refer to real-time data. According to an embodiment, the controller 150 may convert the frequency information according to the number of revolutions of a motor having the specific order noise (e.g., a noise having an order of 48) into the time data by using LMS Audio Replay and Filtering.

Herein, a case that the controller 150 converts frequency information according to the number of revolutions of a motor having the specific order noise into time data is for the purpose of converting the frequency information into sound source data capable of being substantially perceived by passengers because the frequency information according to the number of revolutions of a motor having the specific order noise is not substantially sound source data that is not perceived by the passengers. Accordingly, when converting the frequency information according to the number of revolutions of the motor having a specific order noise into time data, the controller 150 may separate the noise having a specific order from among various noises generated while the driving motor rotates, and then may allow vehicle passengers to perceive the separated noise.

Figure 4:
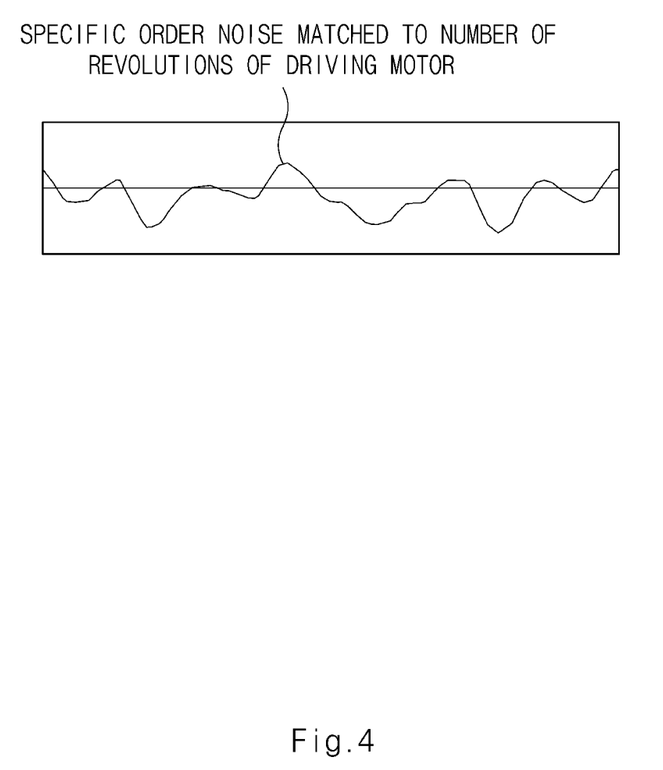
FIG. 4 is a diagram illustrating a result of matching a specific order noise to be converted into time data with the number of revolutions of a motor according to an embodiment of the present disclosure.

The controller 150 may match the noise of the specific order to be converted to the time data depending on the number of revolutions of the driving motor. According to an embodiment, the sound source waveform of the matched result may be illustrated in FIG. 4. FIG. 4 is a diagram illustrating a result of matching a specific order noise to be converted into time data with the number of revolutions of a motor according to an embodiment of the present disclosure.

Figure 5:
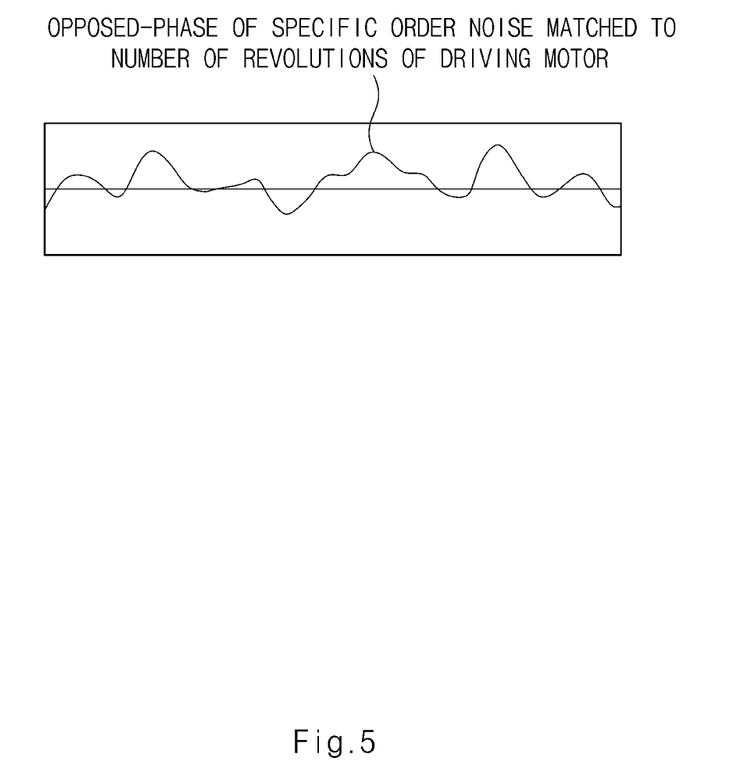
FIG. 5 is a diagram illustrating an opposed-phase of a result of matching a specific order noise to be converted into time data with the number of revolutions of a motor according to an embodiment of the present disclosure.

To reduce the noise of a specific order to be converted into a sound source (time data) capable of being perceived by vehicle passengers, the controller 150 may generate an opposed-phase sound source of a specific order noise (time data) matched to the number of revolutions of a motor. Besides, the controller 150 may store an opposed-phase sound source in the storage 120. According to an embodiment, the waveform of the opposed-phase sound source may be represented as in the graph of FIG. 5. FIG. 5 is a diagram illustrating an opposed-phase of a result of matching a specific order noise to be converted into time data with the number of revolutions of a motor according to an embodiment of the present disclosure.

After an opposed-phase sound source generated as described above is stored in the storage 120, the controller 150 may detect a driving speed and the number of revolutions of a driving motor in real time. When a driving speed of the vehicle exceeds a predetermined speed, the controller 150 may allow an opposed-phase sound source corresponding to the sensed number of revolutions of the driving motor among opposed-phase sound sources stored in advance in the storage 120 to be output.

According to an embodiment, the controller 150 may allow an opposed-phase sound source (an opposed-phase sound source having the waveform of FIG. 5) corresponding to the number of revolutions of the driving motor detected in real time among opposed-phase sound sources stored in the storage 120 to be output through the output device 140. According to an embodiment of the present disclosure, when the opposed-phase sound source is output through the output device 140, the opposed-phase sound source and a noise (a specific order noise) to be reduced among noises generated by the rotation of a driving motor is canceled with each other. Accordingly, according to an embodiment of the present disclosure, the controller 150 may allow vehicle passengers to perceive that the specific order noise is significantly reduced, and may provide the vehicle passengers with quiet and comfortable indoor environments.

In the meantime, the noise generated by the rotation of the driving motor may be changed as the durability is changed as the accumulated distance driven of a vehicle increases. Accordingly, according to an embodiment of the present disclosure, the controller 150 may obtain and store an opposed-phase sound source generated in advance in response to a predetermined accumulated distance driven. According to an embodiment, in the development stage of a vehicle, an opposed-phase sound source according to the noise generated by the rotation of a driving motor by another vehicle, of which the type is the same as the vehicle of the present disclosure, may be generated and stored in advance in response to a predetermined accumulated distance driven. For example, in the development stage of a vehicle, the other vehicle, of which the type is the same as the vehicle of the present disclosure, may generate and store an opposed-phase sound source when the accumulated distance driven is 10000 km, an opposed-phase sound source when the accumulated distance driven is 20000 km, . . . , and an opposed-phase sound source when the accumulated distance driven is 100000 km.

The controller 150 may obtain and store a pre-generated opposed-phase sound source from the other vehicle, of which the type is the same as the vehicle of the present disclosure. When an actual accumulated distance driven of the vehicle of the present disclosure becomes a predetermined accumulated distance driven, the controller 150 may update the opposed-phase sound source stored in the storage 120 as an opposed-phase sound source that is generated in advance depending on an accumulated distance driven.

According to an embodiment, when the accumulated distance driven of the vehicle of the present disclosure is 10000 km, the controller 150 may update the pre-stored opposed-phase sound source as an opposed-phase sound source that is generated in advance when the accumulated distance driven is 10000 km. When the accumulated distance driven of the vehicle of the present disclosure is 20000 km, the controller 150 may update the pre-stored opposed-phase sound source as an opposed-phase sound source that is generated in advance when the accumulated distance driven is 20000 km. Herein, the opposed-phase sound source generated in advance by the other vehicle, of which the type is the same as the vehicle of the present disclosure may be generated by an operation of the controller 150 according to an embodiment of the present disclosure.

As such, even when the noise generated in a vehicle is changed due to durability that decreases as the accumulated distance driven increases, the controller 150 may provide a quiet indoor environment to vehicle passengers by outputting an opposed-phase sound source corresponding to the changed noise.

Figure 6:
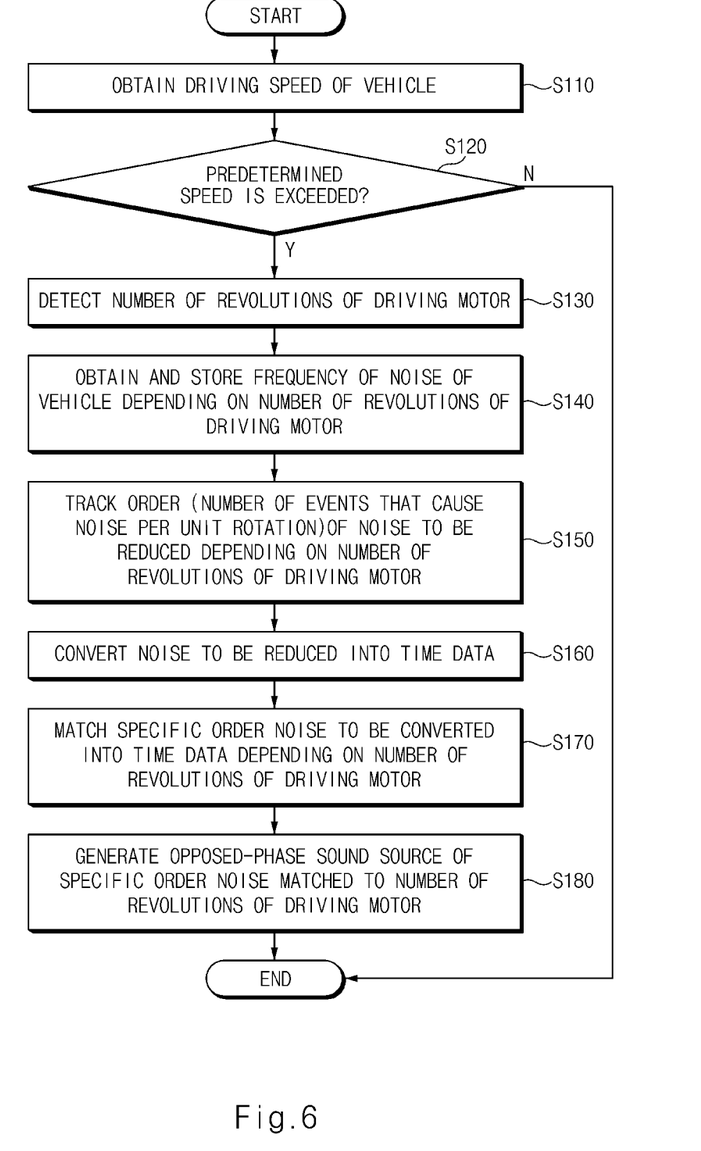
FIG. 6 is a flowchart illustrating a method of generating an opposed-phase sound source according to an embodiment of the present disclosure.

FIG. 6 is a flowchart illustrating a method of generating an opposed-phase sound source according to an embodiment of the present disclosure.

As illustrated in FIG. 6, the controller 150 may obtain a driving speed of a vehicle (S110). The controller 150 may determine whether the driving speed of the vehicle exceeds a predetermined speed (S120). According to an embodiment, the controller 150 may determine whether the driving speed of the vehicle exceeds 30 km/h in S120.

When determining that the driving speed of the vehicle exceeds the predetermined speed in S120, the controller 150 may detect the number of revolutions of the driving motor 130 (S130). When determining that the driving speed of the vehicle does not exceed the predetermined speed (N) in S120, the controller 150 ends without generating an opposed-phase sound source.

Moreover, in S130, the controller 150 may obtain the noise of the driving motor 130, the noise of a decelerator, and the noise of an inverter that are generated as the driving motor 130 rotates. According to an embodiment of the present disclosure, the controller 150 may separate the noise of the driving motor 130, the noise of the decelerator, and the noise of the inverter, which are generated as the driving motor 130 rotates, from one another depending on the number of revolutions of the driving motor 130, and may obtain the separated noises.

The controller 150 may obtain and store each frequency information of the noise of the driving motor 130, the noise of the decelerator, and the noise of the inverter that are generated as the driving motor 130 rotates (S140). According to an embodiment, in S140, the controller 150 may perform FFT on the noise of the driving motor 130, the noise of the decelerator, and the noise of the inverter according to the number of revolutions of the driving motor 130 and may convert the transformed noise into frequency information depending on the number of revolutions of the driving motor 130.

To extract only a specific noise to be reduced (canceled) based on the obtained frequency information in S140, the controller 150 may extract a specific order of a noise to be reduced and may track a frequency according to the number of revolutions of a motor having a specific order noise (S150).

In S150, the order may indicate a number of events each of which causes a noise per unit rotation of a motor. According to an embodiment of the present disclosure, when a part (a part (e.g., a pump, a gear, or the like) associated with a driving motor) is repeatedly touched or vibrated to cause a noise while a driving motor rotates, it is preferably understood that the order is the number of times that the part is repeatedly touched or vibrated. For example, when a sound, which is generated when gears collide with each other, occurs 48 times, while the driving motor rotates, the sound generated when the gears collide with each other causes a noise. Accordingly, it is preferably understood that the sound generated when the gears collide with each other is a noise having the order of 48. When reducing a noise having the order of 48, the controller 150 may extract the noise having the order of 48 based on the frequency information of the noise, and may track the frequency information of the noise having the order of 48 depending on the number of revolutions of the motor (order tracking).

When the frequency information according to the number of revolutions of a motor having the specific order noise (e.g., a noise having the order of 48) to be reduced is tracked, the controller 150 may convert the frequency information into time data (S160). In S160, the time data may refer to real-time data. According to an embodiment, the controller 150 may convert the frequency information according to the number of revolutions of a motor having the specific order noise (e.g., a noise having an order of 48) into the time data by using LMS Audio Replay and Filtering. In S160, a case that the controller 150 converts frequency information according to the number of revolutions of a motor having the specific order noise into time data is for the purpose of converting the frequency information into sound source data capable of being substantially perceived by passengers because the frequency information according to the number of revolutions of a motor having the specific order noise is not substantially sound source data that is not perceived by the passengers. Accordingly, when converting the frequency information according to the number of revolutions of the motor having a specific order noise into time data, the controller 150 may separate the noise having a specific order from among various noises generated while the driving motor rotates, and then may allow vehicle passengers to perceive the separated noise.

The controller 150 may match the specific order noise to be converted into time data depending on the number of revolutions of the driving motor (S170).

When the specific order noise is matched with the number of revolutions of the driving motor in S170, the controller 150 may generate an opposed-phase sound source of a specific order noise (time data) matched to the number of revolutions of a motor to reduce the noise of a specific order to be converted into a sound source (time data) capable of being perceived by vehicle passengers (S180).

Figure 7:
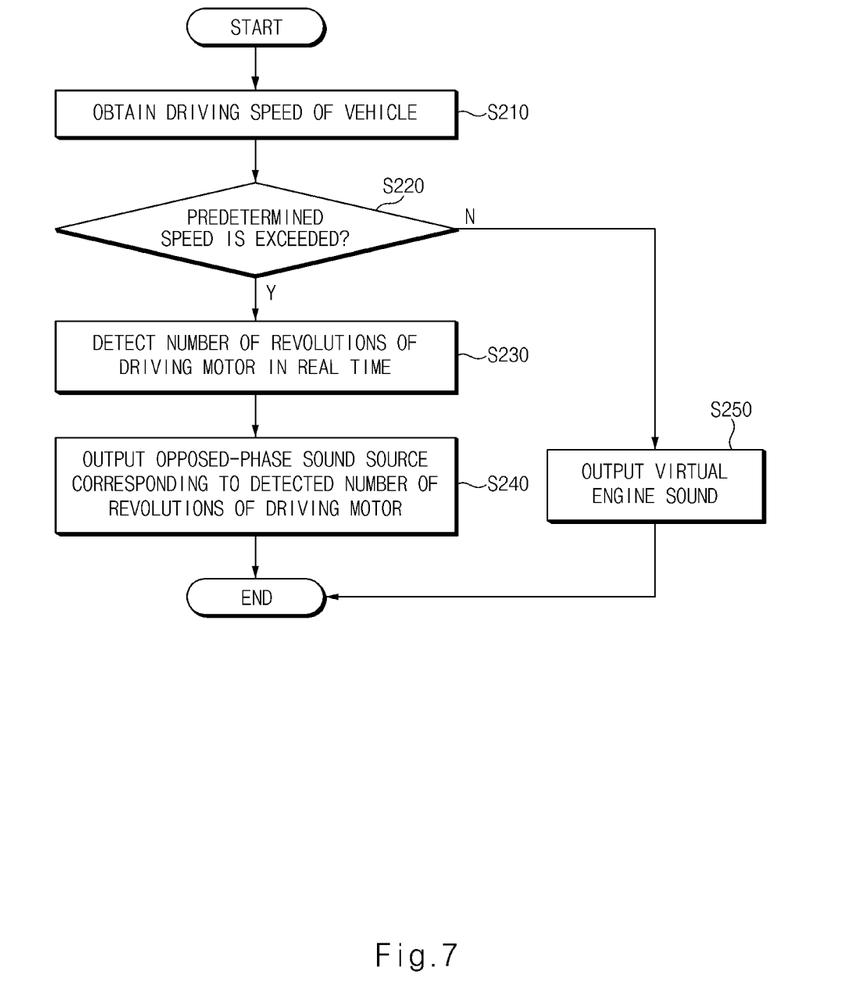
FIG. 7 is a flowchart illustrating a sound output method of a vehicle according to an embodiment of the present disclosure.

FIG. 7 is a flowchart illustrating a sound output method of a vehicle according to an embodiment of the present disclosure.

As illustrated in FIG. 7, the controller 150 may obtain a driving speed of a vehicle (S210). The controller 150 may determine whether the driving speed of the vehicle exceeds a predetermined speed (S220). According to an embodiment, in S220, the controller 150 may determine whether the driving speed of the vehicle exceeds 30 km/h.

When determining that the driving speed of the vehicle exceeds a predetermined speed (Y) in S220, the controller 150 may detect the number of revolutions of a driving motor in real time (S230).

The controller 150 may output an opposed-phase sound source corresponding to the number of revolutions of the driving motor detected in S230 among the opposed-phase sound source, which is matched to the number of revolutions of the driving motor and is generated in S180 of FIG. 6 (S240). When the opposed-phase sound source is output through the output device 140 in S240, the opposed-phase sound source and a noise (a specific order noise) to be reduced among noises generated by the rotation of a driving motor is canceled with each other. Accordingly, in S240, the controller 150 may allow vehicle passengers to perceive that the specific order noise is significantly reduced, and may provide the vehicle passengers with quiet and comfortable indoor environments.

In the meantime, when determining that the driving speed of the vehicle does not exceed the predetermined speed (N) in S220, the controller 150 may output a virtual engine sound (S250). In S250, the virtual engine sound is preferably understood as an artificial noise for notifying pedestrians that an electric vehicle is driving or approaching.

Figure 8:
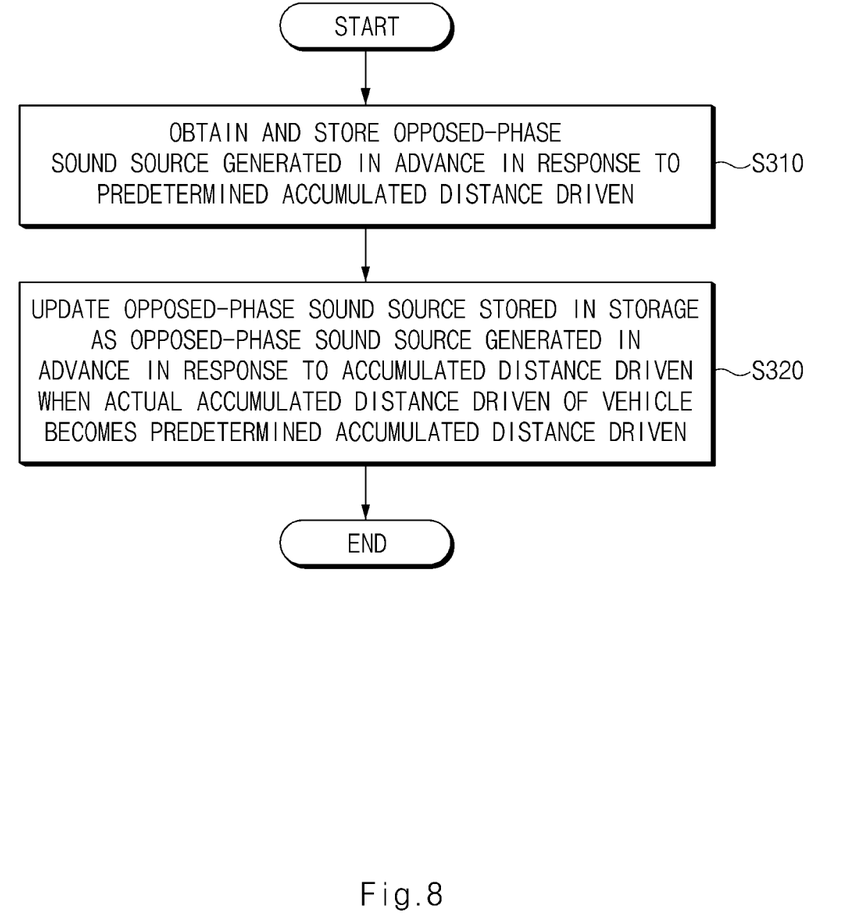
FIG. 8 is a flowchart illustrating a sound output method of a vehicle according to another embodiment of the present disclosure.

FIG. 8 is a flowchart illustrating a sound output method of a vehicle according to another embodiment of the present disclosure.

As illustrated in FIG. 8, the controller 150 may obtain and store an opposed-phase sound source generated in advance in response to a predetermined accumulated distance driven (S310). In S310, the pre-generated opposed-phase sound source may be generated for each predetermined accumulated distance driven (e.g., 10000 km, 20000 km, ..., and 100000 km) set in advance by another vehicle of which the type is the same as the vehicle according to the embodiment of the present disclosure in the development stage of a vehicle. Herein, the opposed-phase sound source generated by the other vehicle, of which the type is the same as the vehicle according to an embodiment of the present disclosure, may be generated by an operation of the controller 150 according to an embodiment of the present disclosure.

When an actual accumulated distance driven of the vehicle becomes a predetermined accumulated distance driven, the controller 150 may update the opposed-phase sound source stored in the storage 120 as an opposed-phase sound source that is generated in advance depending on an accumulated distance driven (S320). For example, when the actual accumulated distance driven of a vehicle is 10000 km, in S320, the controller 150 may update the opposed-phase sound source stored in the storage 120 as an opposed-phase sound source generated in advance by the other vehicle in a case of 10000 km. As such, even when the noise generated in a vehicle is changed due to durability that decreases as the accumulated distance driven increases, the controller 150 may provide a quiet indoor environment to vehicle passengers by outputting an opposed-phase sound source corresponding to the changed noise.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an embodiment of the present disclosure, an apparatus and method for outputting a sound of a vehicle may provide passengers with a comfortable vehicle interior environment by reducing the noise generated by electric vehicle parts inside a vehicle without additional cost or weight.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A sound output apparatus of an electric vehicle, the apparatus comprising:
   a sensor configured to sense a driving speed of the electric vehicle and a number of revolutions of a driving motor of the electric vehicle;
   a storage configured to store opposed-phase sound sources of a noise according to the number of revolutions of the driving motor of the electric vehicle; and
   a controller configured to allow an opposed-phase sound source corresponding to the number of revolutions of the driving motor of the electric vehicle, from among the opposed-phase sound sources stored in the storage, to be output when the driving speed of the electric vehicle exceeds a predetermined speed to reduce the noise according to the number of revolutions of the driving motor of the electric vehicle;
   wherein the noise includes a noise of the driving motor, a noise of a decelerator, and a noise of an inverter that are generated as the driving motor rotates;
   wherein the controller is configured to obtain separately the noise of the driving motor, the noise of a decelerator, and the noise of the inverter according to the number of revolutions of the driving motor of the electric vehicle; and
   wherein the controller obtains each frequency information of the noise of the driving motor, the noise of the decelerator, and the noise of the inverter by performing Fast Fourier Transform (FFT) on the noise of the driving motor, the noise of the decelerator, and the noise of the inverter obtained separately according to the number of revolutions of the driving motor of the electric vehicle.

2. The apparatus of claim 1, wherein the controller tracks a noise of a specific order to be reduced based on the frequency information of the noise depending on the number of revolutions of the driving motor.

3. The apparatus of claim 2, wherein the order indicates a number of events each of which causes a noise per unit rotation of the driving motor.

4. The apparatus of claim 2, wherein the controller converts the noise of the specific order tracked depending on the number of revolutions of the driving motor into time data.

5. The apparatus of claim 4, wherein the controller generates an opposed-phase sound source of the noise of the specific order to be converted into the time data and controls the storage to store the time data.

6. The apparatus of claim 1, wherein the controller obtains and stores the opposed-phase sound source that is pre-generated in response to a predetermined accumulated distance driven.

7. The apparatus of claim 6, wherein the controller updates the opposed-phase sound sources stored in the storage as the pre-generated opposed-phase sound source depending on an accumulated distance driven when the accumulated distance driven of the electric vehicle is the predetermined accumulated distance driven.

8. A method of outputting a sound of an electric vehicle, the method comprising:
   storing, by a storage, opposed-phase sound sources of a noise according to a number of revolutions of a driving motor of the electric vehicle;
   sensing, by a sensor, a driving speed of the electric vehicle and the number of revolutions of the driving motor when the driving speed of the electric vehicle exceeds a predetermined speed; and
   outputting, by a controller, an opposed-phase sound source corresponding to the sensed number of revolutions of the driving motor among the stored opposed-phase sound sources to reduce the noise according the number of revolutions of the driving motor of the electric vehicle;
   wherein the noise includes a noise of the driving motor, a noise of a decelerator, and a noise of an inverter that are generated as the driving motor rotates;
   wherein the controller is configured to obtain separately the noise of the driving motor, the noise of a decelerator, and the noise of the inverter according to the number of revolutions of the driving motor of the electric vehicle;
   obtaining each frequency information of the noise of the driving motor, the noise of the decelerator, and the noise of the inverter by performing Fast Fourier Transform (FFT) on the noise of the driving motor, the noise of the decelerator, and the noise of the inverter obtained separately according to the number of revolutions of the driving motor of the electric vehicle.

9. The method of claim 8, wherein the storing of the opposed-phase sound sources further includes:
   tracking a noise of a specific order to be reduced based on the frequency information of the noise depending on the number of revolutions of the driving motor.

10. The method of claim 9, wherein the order indicates a number of events each of which causes a noise per unit rotation of the driving motor.

11. The method of claim 9, wherein the storing of the opposed-phase sound sources further includes:
    converting the noise of the specific order tracked depending on the number of revolutions of the driving motor into time data.

12. The method of claim 11, wherein the storing of the opposed-phase sound sources includes:
    generating an opposed-phase sound source of the noise of the specific order to be converted into the time data.

13. The method of claim 8, further comprising:
    obtaining and storing the opposed-phase sound source that is pre-generated in response to a predetermined accumulated distance driven.

14. The method of claim 13, further comprising:
    updating the stored opposed-phase sound sources as the pre-generated opposed-phase sound source depending on an accumulated distance driven when the accumulated distance driven of the electric vehicle is the predetermined accumulated distance driven.

* * * * *